United States Patent [19]

Knapczyk

[11] Patent Number: 5,131,040
[45] Date of Patent: Jul. 14, 1992

[54] METHOD FOR BACKING UP AND ERASING ENCRYPTION KEYS

[75] Inventor: Stanley Knapczyk, Justice, Ill.

[73] Assignee: Motorola, Inc., Schaumburg, Ill.

[21] Appl. No.: 662,143

[22] Filed: Feb. 28, 1991

[51] Int. Cl.[5] .............................................. H04L 9/00
[52] U.S. Cl. ...................................... 380/50; 380/21; 380/52
[58] Field of Search .................... 380/50, 23, 21, 52

[56] References Cited
U.S. PATENT DOCUMENTS 4,882,752 11/1989 Lindman et al. ...................... 380/25
4,924,513 5/1990 Herbison et al. ...................... 380/21

Primary Examiner—Thomas H. Tarcza
Assistant Examiner—David Cain
Attorney, Agent, or Firm—John W. Hayes

[57] ABSTRACT

A method for backing up and erasing encryption keys that provides a backup power supply (110) so that keys stored in a memory (104) will not be lost inadvertently, while still permitting keys to be erased, either in response to a low battery condition in the absence of the main supply (101), or in response to an external key erase input (105).

10 Claims, 2 Drawing Sheets

METHOD FOR BACKING UP AND ERASING ENCRYPTION KEYS

TECHNICAL FIELD

This invention relates generally to communication systems such as, but not limited to, secure communication systems, and is more particularly directed toward a method and apparatus that provides battery back up for encryption key storage while permitting erasure of keys to prevent system compromise.

BACKGROUND OF THE INVENTION

Secure communication systems of today are nearly impenetrable to an adversary. Since most successful encryptions used in conjunction with secure systems are based on extremely long pseudo-random sequences that take millions of years to repeat themselves, an encrypted transmission sounds like noise to a listener who does not have the appropriate receiving and decrypting equipment.

Secure transmissions are encrypted with a key, which, as is well-known in the art, is a relatively lengthy number that is used by an encryption device to generate a key stream. The key stream is combined with the information desired to be encrypted (known as plain text in the art) to produce an encrypted data stream known as cipher text.

The part to whom the encrypted message is directed is equipped with a decryption device that will successfully decrypt the transmitted message only if the decryptor is equipped with the same key that was used to encrypt the message. Thus, loss of the encryption key at either the transmitting or receiving end will render the secure communication system useless.

Encryption keys are normally stored in memory devices that require a constant power source in order to preserve memory integrity. With fixed equipment installations, that is, equipment designed to remain in one place for relatively long periods, a main power source derived from the A.C. (alternating current) distribution network can be used to provide power to memory devices.

Of course, power fluctuations, and even total failures, occur with regularity. Therefore, some kind of back up power supply is required in order to preserve encryption keys should partial or total failure of A.C. power come to pass.

At odds with the requirement for preserving encryption keys is the necessity for keeping knowledge of the keys out of the hands of an adversary. If main power were to fail, a battery backup system would eventually begin to degrade. The voltage available from the backup supply may even decay to the point where it is no longer possible to successfully erase an associated key store.

Accordingly, a need arises for a method for backing up an encryption key memory while still ensuring that critical key variables can be erased if necessary.

SUMMARY OF THE INVENTION

This need and others are satisfied by the method of the present invention, which, for secure communication equipment having a first power source and a second power source, ensures that encryption keys stored in an associated memory are not compromised. The method comprises sensing that the first power source output has fallen below a first predetermined threshold, sensing that the second power source output has fallen below a second predetermined threshold, and initiating a programming sequence to place the associated memory int a predetermined state.

DESCRIPTION OF A PREFERRED EMBODIMENT

Figure 1:
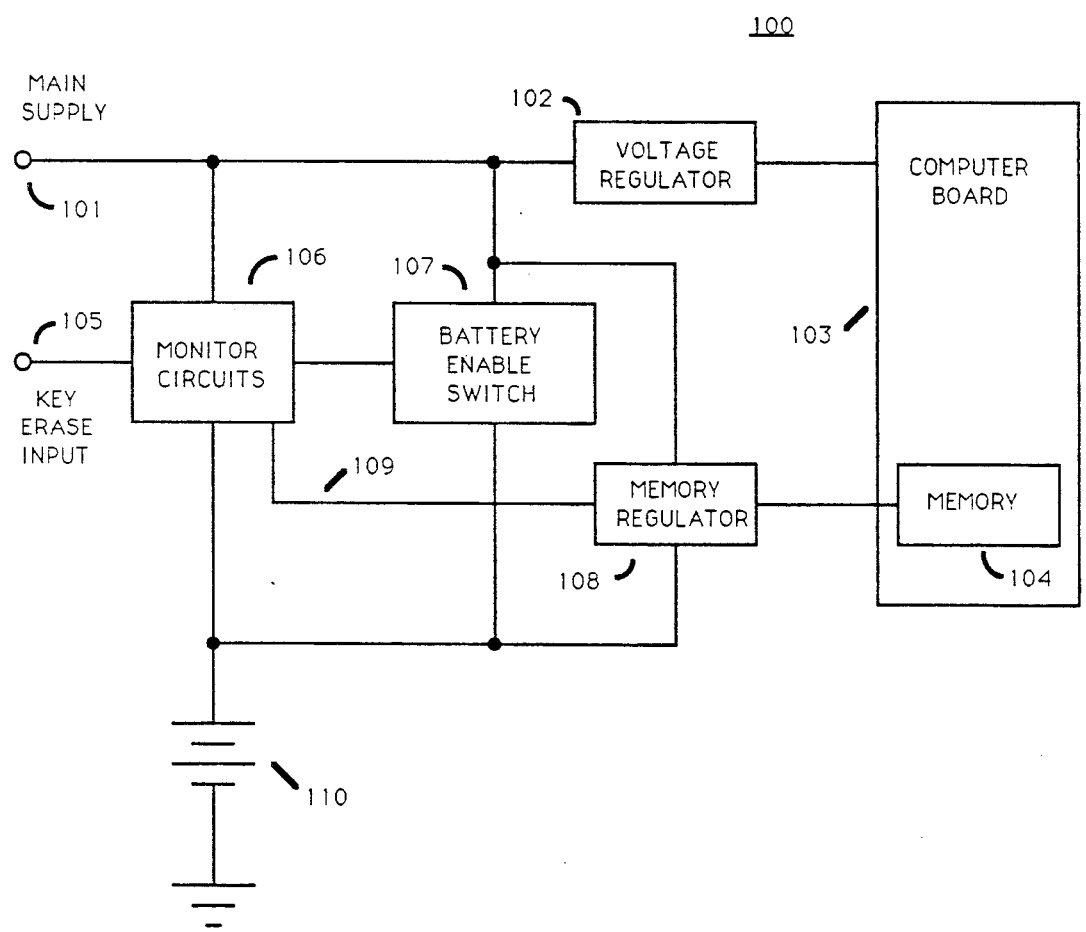
FIG. 1 depicts, in block diagram form, a memory backup system with memory erase capability.

FIG. 1 illustrates an apparatus, generally depicted by the numeral 100, that provides memory backup and erase capability. A main power supply (or first power source), which, in the preferred embodiment, is D.C. (direct current) derived from the A.C. power distribution network, is applied through a main power input terminal (101). This main supply voltage is regulated by a voltage regulator (102) whose output is applied to a computer board (103) that includes a memory (104). The memory (104) is used to store encryption keys. The computer board also includes a microprocessor (not shown for the sake of clarity) whose supply voltage is also derived from the regulator (102) output voltage. The function of the microprocessor will be treated in more detail later in this description.

A backup power supply, or second power source (110), which is a battery in the preferred embodiment, is configured to provide power in the event that the main power source should fail. Monitor circuits (106), using comparators well-known in the art, monitor both the main supply and the backup supply to determine if either or both supplies have fallen below predetermined thresholds. If the main supply falls below a first predetermined threshold, the monitor circuits prevent backup power (110) from reaching the voltage regulator (102) by keeping a battery enable switch (107) open. The removal of power from the input of the voltage regulator (102) keeps the microprocessor on the computer board (103), as well as other computer board components, in a powered down state. The memory (104), however, continues to be supplied with power through a memory regulator (108). The monitor circuits (109), through a transistor switch circuit well-known in the art, can provide a memory shutoff pulse over an interconnecting line (109) that momentarily removes the power supplied to the memory (104) by the memory regulator (108). This operation will be discussed in more detail below.

Figure 2:
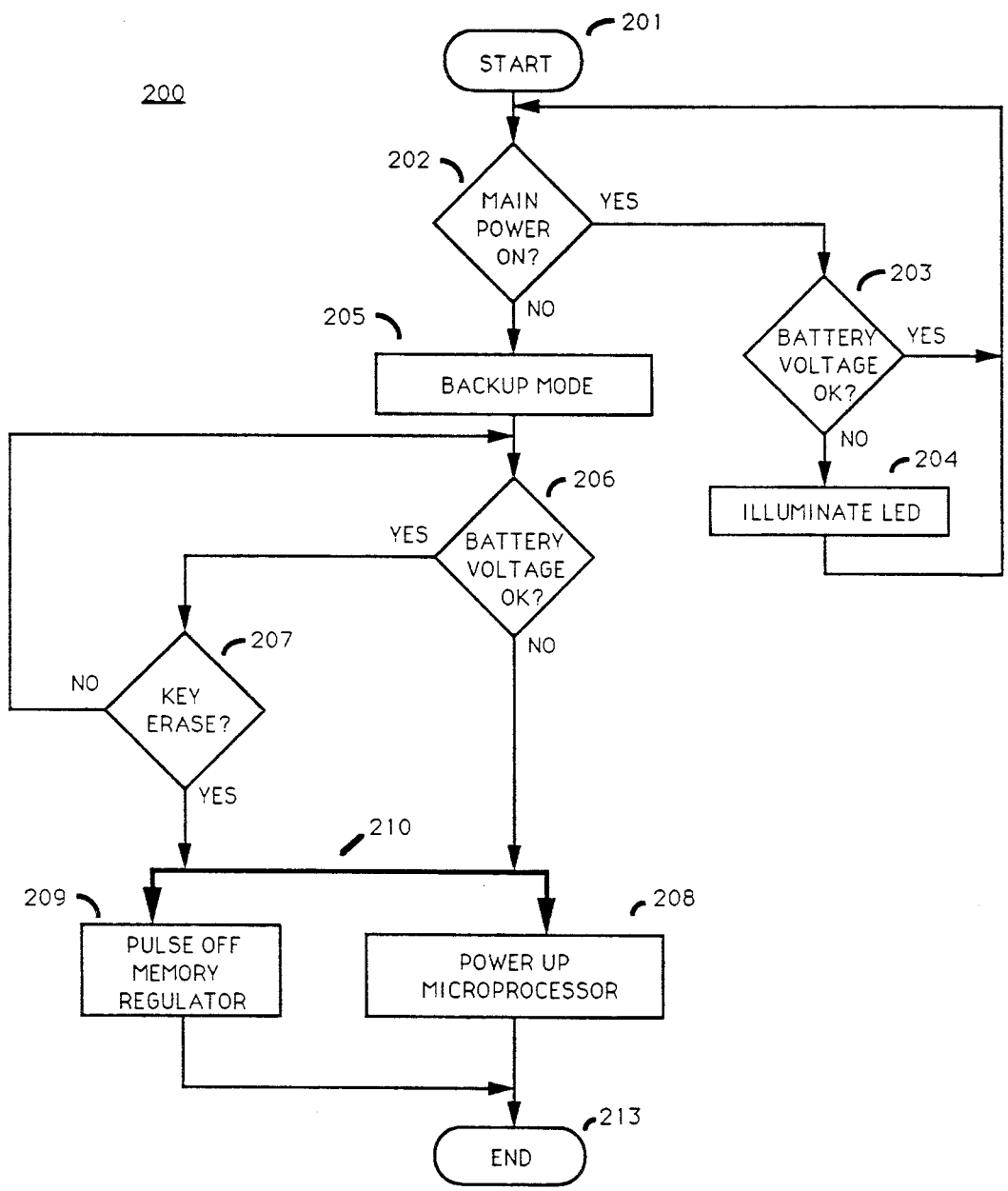
FIG. 2 is a flow chart illustrating a memory backup and erase process.

FIG. 2 is a flow chart, generally depicted by the numeral 200, of a method for providing memory backup and erasure capability. After a START state (201), the monitor apparatus of FIG. 1 (100) enters its primary operation loop, in which the main power output voltage is compared to a first predetermined threshold voltage (block 202). If the main power output voltage is greater than this threshold value, the backup supply voltage is compared with a second predetermined threshold in block 203. If the backup supply exceeds the threshold value, the primary operation loop continues at block 202. However, if the backup supply voltage has fallen below the second predetermined threshold, an LED (light emitting diode, not shown in FIG. 1) is illuminated (block 204) to alert an operator of the low battery condition.

If the main power test described with reference to block 202 indicates that the main power falls short of the threshold value, backup mode is entered (block 205). In this mode, the battery enable switch (107 in FIG. 1) prevents backup power from being applied to the computer board (103). The only computer board component still under power is the memory (104), supplied with power by the backup supply (110) through the memory regulator (108).

After entry into backup mode, the backup supply output voltage is tested to determine if it is above the associated threshold level (block 206). If the backup supply is still adequate, the process tests for the presence of a key erase input (105 in FIG. 1) to the monitor circuits (106). The key erase input allows an operator to manually initiate a key erase procedure.

As indicated by the flow chart (200), there are two scenarios in which a key erase sequence may be initiated. The first occurs when the test of backup supply voltage in block 206 indicates that the backup supply is below its predetermined threshold. As the backup supply deteriorates, as a battery will over time, a point may be reached at which the backup supply no longer has the capacity to initiate a key erase sequence. Therefore, as the backup supply reaches its threshold level, and a successful erase can still be guaranteed, the battery enable switch (107 in FIG. 1) is closed to allow the backup supply (110) to provide input voltage to the voltage regulator (102). The microprocessor on the computer board is powered-up by this operation (block 208).

As is well-known in the art, a microprocessor may be programmed to execute an initialization sequence after power-up. In the preferred embodiment, the microprocessor of the present system executes a code segment that writes logic zeros into the memory (104), thus overwriting any encryption keys and forestalling possible system compromise. Of course, the microprocessor could write any predetermined values into the associated memory, not just logic zeros.

Whenever a key erase sequence is undertaken, whether in response to the battery level test (block 206), or in response to the detection of a key erase input (block 207), two operations are actually initiated simultaneously, as indicated in FIG. 2 by a heavy line (210). One sequence is the microprocessor power-up (block 208) that has just been described. At the same time, the monitor circuits (106 in FIG. 1) provide the memory shutoff pulse discussed above to the memory regulator (108). The memory shutoff pulse is timed so that it is asserted for the same duration as a microprocessor reset pulse generated on the computer board (103) at the time power is applied via the voltage regulator (102). The memory shutoff pulse causes power to be removed from the memory (104) for a short interval. As is well-known, the removal of power form a static memory device tends to result in stored information being lost. This additional attempt at key erasure affords added security.

The key erase process terminates at the END state (213) after simultaneous activation of the processor power-up sequence (block 208) and the pulsing off of the memory regulator (block 209).

What is claimed is:

1. For secure communication equipment having a first power source and a second power source, a method for ensuring that encryption keys stored in an associated memory are not compromised, the method comprising the steps of:
   (a) sensing that the first power source output has fallen below a first predetermined threshold;
   (b) sensing that the second power source output has fallen below a second predetermined threshold; and
   (c) initiating a programming sequence to place the associated memory into a predetermined state.

2. The method in accordance with claim 1, wherein the first power source is derived from A.C. power.

3. The method in accordance with claim 1, wherein the second power source comprises a battery.

4. The method in accordance with claim 1, wherein the step (c) of initiating a programming sequence comprises powering up a microprocessor.

5. The method in accordance with claim 4, wherein the microprocessor executes a code sequence after power-up that writes predetermined values into the associated memory.

6. The method in accordance with claim 5, wherein the predetermined values are logic zeros.

7. The method in accordance with claim 4, wherein the step (c) of initiating a programming sequence further comprises removing power from the associated memory for a relatively short period of time.

8. The method in accordance with claim 7, wherein the step of removing power from the memory occurs at substantially the same time as the step of powering up the microprocessor.

9. A method for backing up and erasing encryption keys, the method comprising:
   (a) monitoring output voltages of a first power source and a second power source; and, in the event that the first power source falls below a predetermined threshold,
   (a) entering a backup mode wherein only a memory device having encryption keys stored therein remains under power; then, in response to the second power source falling below a predetermined threshold,
   (a) initiating a power-up sequence that applies power to at least an associated microprocessor such that the microprocessor executes a code sequence that places the memory device into a predetermined state; and, at substantially the same time that the power-up sequence is initiated,
   (a) removing power from the memory device for a relatively short period of time.

* * * * *

UNITED STATES PATENT AND TRADEMARK OFFICE
CERTIFICATE OF CORRECTION

PATENT NO. : 5,131,040
DATED : July 14, 1992
INVENTOR(S) : Stanley Knapczyk It is certified that error appears in the above-identified patent and that said Letters Patent is hereby corrected as shown below:

In col. 4, please insert after claim 9, claim 10 as follows:

For secure communication equipment having a first power source and a second power source, an apparatus ensuring that encryption keys stored in an associated memory are not compromised, the apparatus comprising:

means for sensing that the first power source output has fallen below a first predetermined threshold;

means for sensing that the second power source output has fallen below a second predetermined threshold;

means for initiating a programming sequence to place the associated memory into a predetermined state.

Signed and Sealed this

Tenth Day of August, 1993

Attest:

MICHAEL K. KIRK

*Attesting Officer*  *Acting Commissioner of Patents and Trademarks*